(12) United States Patent
Schuette

(10) Patent No.: US 11,414,145 B2
(45) Date of Patent: Aug. 16, 2022

(54) DEVICE AND METHOD FOR JOINING A LENS TO A HOUSING OF A LIGHTING DEVICE OF A MOTOR VEHICLE

(71) Applicant: HELLA GmbH & Co. KGaA, Lippstadt (DE)

(72) Inventor: Andreas Schuette, Bueren (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/337,038

(22) Filed: Jun. 2, 2021

(65) Prior Publication Data

US 2021/0284263 A1  Sep. 16, 2021

Related U.S. Application Data

(60) Division of application No. 16/288,724, filed on Feb. 28, 2019, now Pat. No. 11,136,081, which is a
(Continued)

(30) Foreign Application Priority Data

Aug. 30, 2016 (DE) ..................... 10 2016 116 131.4

(51) Int. Cl.
*B29C 65/00* (2006.01)
*B62D 65/16* (2006.01)
(Continued)

(52) U.S. Cl.
CPC .............. *B62D 65/16* (2013.01); *B23P 19/04* (2013.01); *B23P 19/10* (2013.01);
(Continued)

(58) Field of Classification Search
CPC . B62D 65/16; B29C 65/7802; B29C 65/7841; B29C 66/54; B29C 65/02;
(Continued)

(56) References Cited

U.S. PATENT DOCUMENTS 6,161,951 A  12/2000 Yoneyama et al.
6,270,242 B1  8/2001 Suzuki et al.
(Continued)

FOREIGN PATENT DOCUMENTS

DE  198 51 835 A1  5/1999
DE  198 13 294 C1  8/1999
(Continued)

OTHER PUBLICATIONS

International Search Report dated Nov. 22, 2017 in corresponding application PCT/EP2017/071306.

*Primary Examiner* — Jun S Yoo
(74) *Attorney, Agent, or Firm* — Muncy, Geissler, Olds & Lowe, P.C.

(57) ABSTRACT

A method for joining a lens to a housing of a lighting device of a motor vehicle, in which the housing is accommodated and secured in a receptacle device. The method includes accommodating the lens in a pre-centering device, aligning the lens towards the housing during an alignment procedure and accommodating the lens by a holding device after the alignment procedure. The method further includes holding the lens by the holding device during a subsequent joining process, releasably attaching the holding device to the pre-centering device, aligning, via fastening elements, during the alignment procedure and moving the accommodated lens and the holding device attached to the pre-centering device relative to the receptacle device such that the lens and the holding device are aligned on the housing accommodated in the receptacle device.

5 Claims, 1 Drawing Sheet

Related U.S. Application Data continuation of application No. PCT/EP2017/071306, filed on Aug. 24, 2017.

(51) Int. Cl.
| | |
|---|---|
| *F21S 43/27* | (2018.01) |
| *B29C 65/78* | (2006.01) |
| *B23P 19/04* | (2006.01) |
| *B23P 19/10* | (2006.01) |
| *B29L 31/30* | (2006.01) |
| *B29L 31/00* | (2006.01) |
| *B29C 65/02* | (2006.01) |
| *B29C 65/06* | (2006.01) |
| *B60Q 1/30* | (2006.01) |

(52) U.S. Cl.
CPC ...... *B29C 65/7802* (2013.01); *B29C 65/7841* (2013.01); *B29C 66/54* (2013.01); *F21S 43/27* (2018.01); *B29C 65/02* (2013.01); *B29C 65/06* (2013.01); *B29L 2031/30* (2013.01); *B29L 2031/747* (2013.01); *B60Q 1/30* (2013.01)

(58) Field of Classification Search
CPC . B29C 65/06; B29C 65/7847; B29C 66/8322; B29C 65/1432; B29C 65/1412; B23P 19/04; B23P 19/10; F21S 43/27; B29L 2031/30; B29L 2031/747; B60Q 1/30

See application file for complete search history.

(56) References Cited

U.S. PATENT DOCUMENTS

| | | | |
|---|---|---|---|
| 2005/0225991 A1* | 10/2005 | Yamazaki | ............. B29C 66/348 |
| | | | 362/362 |
| 2005/0284851 A1* | 12/2005 | Enoki | ..................... B29C 66/54 |
| | | | 219/121.64 |

FOREIGN PATENT DOCUMENTS

| | | | | |
|---|---|---|---|---|
| DE | 199 07 930 A1 | 10/1999 | | |
| DE | 10 2006 053 044 A1 | 5/2008 | | |
| DE | 102006053044 A1 * | 5/2008 | ......... | B29C 65/7802 |
| DE | 10 2010 015 505 A1 | 10/2011 | | |
| DE | 10 2010 024 169 A1 | 12/2011 | | |
| EP | 3 205 481 A1 | 8/2017 | | |

* cited by examiner

DEVICE AND METHOD FOR JOINING A LENS TO A HOUSING OF A LIGHTING DEVICE OF A MOTOR VEHICLE

This nonprovisional application is a Divisional Application of U.S. application Ser. No. 16/288,724, which was filed on Feb. 28, 2019, and is a continuation of International Application No. PCT/EP2017/071306, which was filed on Aug. 24, 2017, and which claims priority to German Patent Application No. 10 2016 116 131.4, which was filed in Germany on Aug. 30, 2016, and which are both herein incorporated by reference.

BACKGROUND OF THE INVENTION

Field of the Invention

The present invention relates to a device for joining a lens to a housing of a lighting device of a motor vehicle. The invention additionally relates to a method for installing a lens on a housing of a lighting device of a motor vehicle.

Description of the Background Art

During installation of a lighting device, such as a taillight for example, in the body of a motor vehicle, it is a critical requirement that the gap profile or joint profile between the installed lighting device and the body maintains the closest possible tolerances. For process-related reasons, the lighting device is not accommodated on a 3-2-1 reference point system as required, but instead at the housing edge below the weld region in order to accommodate the requisite welding forces.

Since the housing is not aligned on the customer-side 3-2-1 reference point system in the welding fixture, the required continuous manufacturing chain is broken here. The lens can only be determined on the basis of a measurement of the position relative to the housing in a subsequent measurement process that recreates the reference point system. The lens is then realigned on the basis of such a measurement report. However, this alignment procedure only accounts for dimensional deviations in functional dimensions, which is to say a lens that is too small on a housing that is too large, for example. The setup person has hitherto arranged the position of the lens relative to the housing with the goal of an equal gap profile on both sides. In doing so, the setup person fundamentally assumes a stable dispersion, and attempts to arrange the location of the process in the center between the upper/lower tolerance limits.

This manufacturing process therefore has a major weakness, since it only allows for a stable manufacturing process or components with zero deviation in single-component manufacturing/prefabrication. All dispersions that arise from single-component manufacturing or prefabrication have full effect after alignment, and consequently are reflected in the joined component. Consequently, the setup person must continuously intervene in the process in order to repeatedly rearrange measurement points that fall outside the limits. This results in defect investigation, interventions in the ongoing manufacturing process, and other measures that cause high costs, especially in production.

Often, the geometric reserves of the components with regard to relative displacement are limited, since the geometric minimum distances between the housing and the required radiant preheaters are smaller than the geometric reserves in the configuration of the weld seam. The displacement of the housing receptacle relative to the lens provided by default for tolerance compensation is thus limited.

The lens is usually attached to the housing by means of a joining process, in particular a welding process, in that a weld joint is formed between the edge region of the lens and the edge region of the housing. During the joining process the lens is held in a holding device. By means of the holding device, the lens can be moved downward toward the housing held in a receptacle device, and upward away from the housing. In order to be able to achieve a defined positioning of the lens relative to the housing during the joining process, provision is usually made that the receptacle device is aligned relative to the holding device. However, as a result of the change in the position of the receptacle device, and thus also of the housing accommodated in the receptacle device, a realignment of the housing receptacle relative to the receptacle on the top side for accommodating the lens can result in a collision between the internal components already placed in the housing and the joining device, as for example infrared heaters moving inward to heat the edge regions of the lens and housing to be joined; consequently the housing receptacle should be moved out of the zero position to the position of the head section beforehand if the position of the preheater was not changed.

SUMMARY OF THE INVENTION

It is therefore an object of the present invention to provide a device and a method for aligning the holding device relative to the receptacle device, with which no damage occurs to the preheater elements that moves between the two elements.

The device according to an exemplary embodiment of the invention has a receptacle device for accommodating and securing the housing, a pre-centering device for accommodating and positioning the lens on the housing during an alignment procedure, in particular in setup mode, and a holding device for accommodating the lens after the alignment procedure and for holding the lens during an adjustment procedure. The device is designed such that the holding device is releasably attached to the pre-centering device by means of fastening elements with appropriate locating stops during the alignment procedure in setup mode, and that during the alignment procedure the pre-centering device, together with the accommodated lens and the holding device attached to the pre-centering device, is movable relative to the receptacle device in a flat plane such that the lens and the holding device can be aligned relative to the housing accommodated in the receptacle device.

The method according to the invention is distinguished in that the housing is accommodated and secured in a receptacle device, the lens is accommodated in a pre-centering device and is positioned on the housing during an alignment procedure in setup mode, and the lens is accommodated by a holding device after the alignment procedure and is held by the holding device during a subsequent adjustment process, wherein the holding device is releasably attached to the pre-centering device by means of fastening elements during the alignment procedure, and during the alignment procedure the pre-centering device, together with the accommodated lens and the holding device attached to the pre-centering device, is moved relative to the receptacle device such that the lens and the holding device are aligned relative to the housing accommodated in the receptacle device.

The device according to the invention for joining includes here any device that serves to arrange a lens on a housing of a lighting device, wherein the joining includes a positioning of the lens. The term "joining" can be understood in this context to mean any form of arranging, positioning, and/or aligning, with or without an attachment or integral, non-positive, or frictional connection between the mating parts. Hence, the joining device need not necessarily be designed for integrally connecting the two mating parts. Consequently, in the present context joining can also be understood to mean a procedure that is directed primarily or exclusively toward positioning of the mating parts relative to one another.

In the device according to the invention and the method according to the invention, the provision of a pre-centering device creates a tolerance compensation system that permits positioning of the lens on the housing with very high accuracy, so that the smallest possible tolerances on the gap dimensions between the lighting device and the body can be achieved during installation in a body. The pre-centering device permits positioning of the lens relative to the housing located in a fixed, defined position. To this end, the housing is accommodated in a defined position, and accommodated as previously in a receptacle device on the back of the housing below the surrounding weld region.

By means of the pre-centering device and the frame element, the lens can be aligned in the reference point system defined for the housing, thus permitting an alignment of the lens relative to the housing that is as accurate and defined as possible. Provision is made according to the invention that the holding device is also attached to the pre-centering device during the alignment procedure in setup mode. As a result, an alignment or pre-centering of the holding device relative to the receptacle device, or to the housing accommodated in the receptacle device, can also take place at the same time as an alignment or pre-centering of the lens during the alignment procedure in setup mode. The holding device is releasably attached to the pre-centering device during the alignment procedure, so that the attachment of the holding device can be released again from the pre-centering device after the alignment procedure, and thus after an alignment of the holding device, so the holding device can be separated from the pre-centering device again. During the alignment procedure in setup mode, a motion of the holding device relative to the receptacle device that follows the motion of the receptacle device is made possible by the attachment of the holding device to the pre-centering device and by the motion of the pre-centering device, whereas the receptacle device remains secured in a fixed position. Therefore, a change in the position of the receptacle device, and thus also a change in the position of the housing accommodated in the receptacle device, is no longer necessary in order to achieve pre-centering, and hence to achieve creation of a tolerance compensation system, so the receptacle device and the housing accommodated in the receptacle device can remain in a defined and fixed position, and consequently a collision between the housing, or the internal components already placed in the housing, and the joining device can be reliably avoided in a subsequent joining process. As a result, the process reliability of the device and the method in the process of setting up a lens on a housing can be considerably improved and made more reliable than in the prior art, especially for avoiding a collision with an IR heater or another radiant preheater. In this way, an additional option is also created for the future to no longer need to align the housing with respect to the lens.

The pre-centering device can have a frame element and multiple positioning elements attached to the frame element for accommodating the lens during the alignment procedure, wherein the frame element preferably is mounted so as to be movable relative to the receptacle device. As a result of the movable mounting of the frame element with locating stops, accommodated lenses can be moved by means of a motion of the frame element relative to the receptacle device. Together with the accommodated lens, the frame element can be moved such that it can be displaced into a defined position relative to the housing accommodated in the receptacle device; in order to align the holding device relative to the receptacle device, the holding device preferably is releasably attached to the frame element by means of the fastening elements during the alignment procedure. Through the attachment of the holding device to the frame element, the motion of the frame element can be transmitted directly to the holding device, so that the holding device can follow the motion of the frame element in a flat plane, for example over a base plate. Thus, in the event of a translational motion of the frame element, a corresponding translational motion of the holding device relative to the receptacle device also takes place.

The fastening elements can be designed in the form of elongated spacers. As a result of such a design of the fastening elements, a defined distance between the pre-centering device and the holding device can be achieved. The elongated spacers, which can be bar-shaped or columnar in design, for example, can each be releasably attached to the pre-centering device at one free end, and to the holding device at the other, opposite free end.

For example, openings into which the fastening elements can be inserted can be formed on the pre-centering device, in particular the frame element of the pre-centering device, and on the holding device. By insertion of the fastening elements into suitable openings on the pre-centering device and the holding device, attachment and release of the fastening elements from the pre-centering device, and also the holding device, can be accomplished quickly and easily. For example, the fastening elements can snap into place inside the openings in order to be able to prevent unintentional release of the fastening elements from the openings, especially during a motion of the pre-centering device or of the frame element of the pre-centering device. Other types of releasable attachment of the fastening elements to the holding device and the pre-centering device can also be provided as alternatives to insertion into openings.

The holding device preferably is attached to a tool upper part in such a manner that the holding device is attached to the tool upper part in a fixed position during the joining process following the pre-centering procedure and that the holding device is displaceably mounted relative to the tool upper part during the pre-centering procedure. The holding device is thus preferably arranged on the tool upper part both during the pre-centering procedure and during the joining process, but the manner of the arrangement can be changed. For example, the holding device can be attached to the tool upper part by means of screws. Elongated recesses through which the screws are passed can be provided on the holding device. When the screws are fully tightened, the holding device is attached to the tool upper part in a fixed position. When the screws are loosened somewhat without being completely removed, the holding device can be displaced along the recesses relative to the tool upper part, and thus relative to the screws, in order to align the holding device relative to the receptacle device via the pre-centering device. After alignment of the holding device, the screws can be fully tightened again in the appropriately adjusted position so that the holding device is once again arranged in a fixed position on the tool upper part. This permits easy and fast handling during alignment of the holding device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
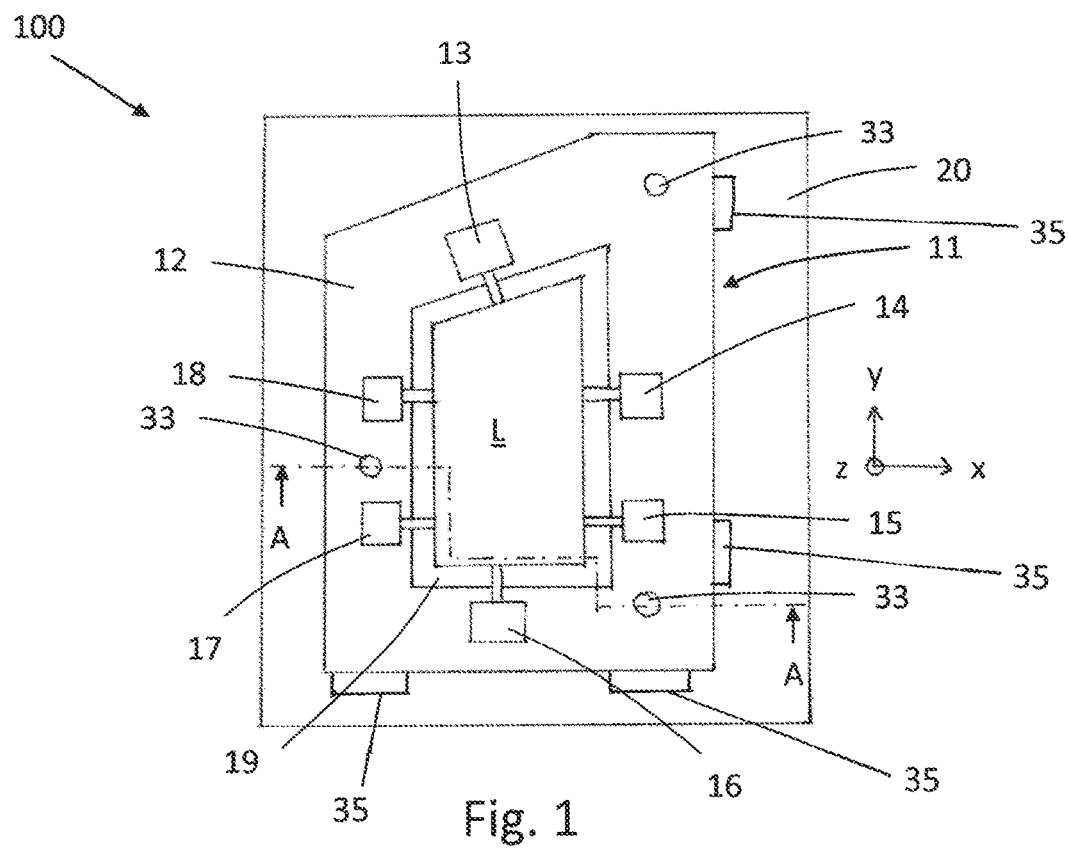
FIG. 1 is a schematic representation of a device according to the invention in a plan view from above.
Figure 2:
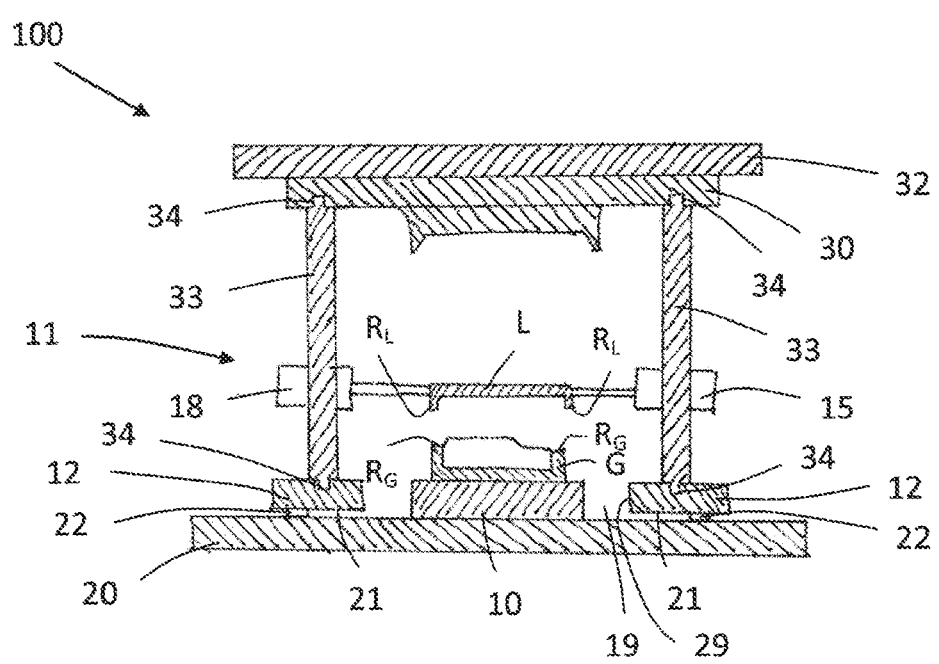
FIG. 2 is a schematic, cross-sectional representation of the device shown in FIG. 1 along the line A-A.

Shown schematically in FIGS. 1 and 2 is a device 100 for installing a lens L on a housing G of a lighting device of a motor vehicle. The lens L is attached to the housing G by means of a joining process, in particular a welding process, in that the edge region $R_L$ of the lens L is integrally connected to the edge region $R_G$ of the housing G. Prior to the joining, the lens L and housing G must be aligned with one another in order to compensate for tolerance deviations.

The device 100 has a receptacle device 10, as can be seen in FIG. 2, to accommodate the housing G. In the receptacle device 10, the housing G can be aligned on a reference point system by placing the housing G on this reference point system. The reference point system can have multiple reference points spaced apart from one another, which are spread out or positioned in an x-y plane. A defined positioning of the housing G in the receptacle device 10, and thus in the device 100, can be accomplished by means of the reference points.

In addition, the device 100 has a pre-centering device 11 for positioning and alignment of the lens L on the housing G. By means of this pre-centering device, an alignment of a holding device 30 relative to the housing G can also be accomplished simultaneously with the alignment of the lens L relative to the housing G. The holding device 30 serves to accommodate the lens L after a pre-centering procedure and to hold it during a subsequent joining process.

The holding device 30 is releasably attached to the pre-centering device 11 during the pre-centering procedure by means of fastening elements 33 so that a connection is formed between the pre-centering device 11 and the holding device 30. After the pre-centering procedure, the connection or attachment between the holding device 30 and the pre-centering device 11 is released again so that the holding device 30 is separated from the pre-centering device 11 again during a subsequent joining process.

The pre-centering device 11 has a frame element 12 and multiple positioning elements 13, 14, 15, 16, 17, 18 attached to the frame element 12.

The frame element 12 is plate-like in design. The frame element 12 has a window-like opening 19 so that the frame element 12 can be arranged around the receptacle device 10.

The frame element 12 annularly surrounds the receptacle device 10 in this case, wherein the frame element 12 here preferably is polygonal in design, as can be seen in FIG. 1. The locating stops 35 shown serve the purpose that reliable displacement of the frame element 12, of the fastening elements 33, and of the holding device 30 can be carried out by means of the locating stops 35 during the alignment procedure.

The holding device 30 is releasably attached to the frame element 12 of the pre-centering device 11 during the pre-centering procedure. For the purpose of releasable attachment, multiple fastening elements 33 designed in the form of elongated spacers are arranged between the holding device 30 and the frame element 12. The fastening elements 33 in this case have a great enough length that the holding device 30 is held at a distance from the positioning elements 13, 14, 15, 16, 17, 18 arranged on the frame element 12 so that the holding device 30 is also located a distance from the lens L arranged between the positioning elements 13, 14, 15, 16, 17, 18. In the design shown here, the fastening elements 33 have a columnar shape. The fastening elements 33 are distributed over the surface of the frame element 12 and also over the surface of the holding device 30 so that the holding device 30 is aligned and positioned parallel to the frame element 12. Openings 34, here in the form of blind holes, are formed in both the frame element 12 and in the holding device 30, into which openings the fastening elements 33 are inserted during the pre-centering procedure and from which the fastening elements 33 can be quickly and easily separated again after the pre-centering procedure.

Both the frame element 12 and the receptacle device 10 are arranged on a base plate 20. The receptacle device 10 is positioned on the base plate 20 in a fixed manner in that the receptacle device 10 is attached to the base plate 20, for example by means of screws. In contrast, the frame element 12 is movably mounted on the base plate 20. For the movable mounting, it is possible for multiple ball bearings 22, for example in the form of ball bushings, to be arranged in a distributed manner on an underside 21 of the frame element 12 facing toward the base plate 20, as is shown in FIG. 2. Due to the movable mounting of the frame element 12, said element can be moved relative to the receptacle device 10 that is fixed in position, in particular during the pre-centering procedure. The frame element 12 in this design can be moved relative to the receptacle device 10 such that the lens L, and also the holding device 30, can be aligned relative to the housing G accommodated in the receptacle device 10. By means of the alignment of the lens L and also of the holding device 30 relative to the housing G, the lens L and the holding device 30 are aligned on the reference point system and thus on the reference points on which the housing G is also aligned.

The motion of the frame element 12 can be controlled pneumatically or electrically. The motion of the frame element 12 takes place in the x- and y-directions so that the frame element 12, and thus also the holding device 30 attached to the frame element 12, can be moved parallel to the base plate 20 during the pre-centering procedure.

For the purpose of pre-centering, multiple stop elements are formed on the frame element 12. These stop elements can be implemented in the form of bar-shaped projections and can protrude, in the vicinity of the window-like opening 19 of the frame element 12, from the inner surface 29 facing toward the receptacle device 10. By means of the stop elements, the frame element 12 can be aligned on the housing G accommodated in the receptacle device 10.

The lens L is accommodated, aligned, and clamped in the pre-centering device 11 by means of the positioning elements 13, 14, 15, 16, 17, 18. The positioning elements 13, 14, 15, 16, 17, 18 are distributed about the perimeter of the frame element 12 for this purpose. As a result of the fact that the positioning elements 13, 14, 15, 16, 17, 18 are positioned in a fixed manner on the movably mounted frame element 12, when the frame element 12 is moved, the positioning elements 13, 14, 15, 16, 17, 18 can also be aligned relative to the housing G accommodated in the receptacle device 10.

A certain number of positioning elements 13, 14, 15, 16, 17, 18 are designed as block slides and a certain number of positioning elements 13, 14, 15, 16, 17, 18 are designed as spring-loaded slides. In the embodiment shown here, three positioning elements 13, 14, 15 are designed as block slides and three positioning elements 16, 17, 18 as spring-loaded slides. Due to the implementation of the positioning elements 13, 14, 15, 16, 17, 18 as block slides and as spring-loaded slides, the lens L can be pre-aligned as it is being accommodated in the positioning elements 13, 14, 15, 16, 17, 18 before it is clamped between the positioning elements 13, 14, 15, 16, 17, 18. In this design, one positioning element 16, 17, 18 implemented as a spring-loaded slide is positioned opposite each positioning element 13, 14, 15 implemented as a block slide.

After the pre-centering procedure, the lens L can be gripped by the likewise aligned holding device 30 through the creation of a vacuum, and be removed from the pre-centering device 11 by means of the holding device 30. Prior to gripping of the lens L, the holding device 30 is separated or released from the pre-centering device 11, in particular from the frame element 12 of the pre-centering device 11, by removal of the fastening elements 33.

The holding device 30 is attached to a tool upper part 32 such that the holding device 30 is displaceably mounted relative to the tool upper part 32 during the pre-centering procedure and the holding device 30 is attached to the tool upper part 32 in a fixed position during the subsequent joining process. The holding device 30 is held on the tool upper part 32 by screws, both during the pre-centering procedure and during the joining process. Elongated recesses through which the screws are passed can be provided on the holding device 30. When the screws are fully tightened, the holding device 30 is attached to the tool upper part 32 in a fixed position. When the screws are loosened somewhat without being completely removed, the holding device 30 can be displaced along the recesses relative to the tool upper part 32, and thus relative to the screws, in order to align the holding device 30 relative to the receptacle device 10 through a motion of the pre-centering device 11 or of the frame element 12 of the pre-centering device 11. After alignment of the holding device 30, the screws can be fully tightened again in the appropriately adjusted position so that the holding device 30 is once again arranged in a fixed position on the tool upper part 32. Once the aligned holding device 30 is attached to the tool upper part 32 in a fixed position, the fastening elements 33 can be removed.

During the subsequent joining process, the lens L can be held by means of the holding device 30. The holding device 30 is positioned above the receptacle device 10 and above the pre-centering device 11 in the z-direction. The holding device 30 can be moved in the z-direction by a motion of the tool upper part 32 so that the lens L held in the holding device 30 can be placed on the housing G accommodated in the receptacle device 10, and also lifted off of the same, by a movement of the holding device 30.

After the pre-centering procedure and during the joining process, the frame element 12 can be secured on the base plate 20 in a fixed position by, for example, screws. Prior to a subsequent pre-centering procedure, the screws can then be loosened again in order to reestablish the movability of the frame element 12 relative to the receptacle device 10.

During an installation of a lens L on a housing G, the housing G is first placed on the reference points of the reference point system and secured in this position in the receptacle device 10.

Next, the lens L is placed on the housing G, is accommodated by the positioning elements 13, 14, 15, 16, 17, 18, and is clamped between the positioning elements 13, 14, 15, 16, 17, 18 in that the lens L is placed on the positioning elements 13, 14, 15 implemented as block slides and then the positioning elements 16, 17, 18 implemented as spring-loaded slides are moved against the lens L so that the lens L is clamped against the positioning elements 13, 14, 15 implemented as block slides.

After that, the holding device 30 is attached to the frame element 12 of the pre-centering device 11 by means of the fastening elements 33 in that the fastening elements 33 are inserted into the openings 34 formed in the frame element 12 and the holding device 30. Once the holding device 30 is secured on the frame element 12, the fastening of the holding device 30 to the tool upper part 32 is released, so that the holding device 30 is still held on the tool upper part 32 but the holding device 30 can nevertheless be moved parallel to the tool upper part 32.

In a subsequent step, pre-centering of the lens L, and also of the holding device 30, relative to the housing G that is held in the fixed position is accomplished by means of the pre-centering device 11 in that the pre-centering device 11, together with the accommodated lens L and the holding device 30 attached to the pre-centering device 11, is aligned relative to the housing G accommodated in the receptacle device 10. In this process, the movably mounted frame element 12, with its stop elements, is moved against the housing G accommodated in the receptacle device 10, and is thereby aligned on the housing G, by a controller through, e.g., pneumatic cylinders or electric motors. As a result, the frame element 12, the lens L accommodated between the positioning elements 13, 14, 15, 16, 17, 18, and the holding device 30 secured to the frame element 12 in a fixed position are then aligned relative to the housing G, and thus also relative to the reference points of the reference point system. The lens L and also the holding device 30 are now pre-centered and optimally aligned relative to the housing G and the reference point system.

After the alignment, the holding device 30 is first attached to the tool upper part 32 so as to be fixed in the aligned position, in particular is secured in place with screws, so that the holding device 30 is attached to the tool upper part 32 in a fixed manner in this aligned position. After the attachment in a fixed position to the tool upper part 32, the holding device 30 can be moved away from the pre-centering device, upward in the z-direction, so that the fastening elements 33 between the holding device 30 and the frame element 12 can be removed.

Subsequently, the holding device 30 can be moved downward in the z-direction toward the lens L, in order to remove the lens from the pre-centering device 11. In this process, the holding device 30 can accommodate and hold the pre-centered and aligned lens L through the application of vacuum.

In a next step, the joining process for integral connection of the pre-centered lens L to the housing G can be started.

This can take place such that, after a transfer of the lens L from the positioning elements 13, 14, 15, 16, 17, 18 to the holding device 30, the lens L is first moved upward in the z-direction, and thus moved away from the housing G, by means of the holding device 30. Then infrared heaters can be moved inward between the lens L and the housing G; they heat the weld contours of the housing G and of the lens L. The weld contours can be the edge region $R_G$ of the housing G and the edge region $R_L$ of the lens L. Then the infrared heaters can be removed, and the lens L held in the holding device 30 can be lowered towards the housing G by means of the holding device 30 until the weld contour or the edge region $R_L$ of the lens L rests on the weld contour or the edge region $R_G$ of the housing G. Then the actual joining, in particular welding, can take place. This can be accomplished by means of a friction welding process, for example.

The invention is not limited in its implementation to the preferred exemplary embodiment provided above. Instead, a number of variants are possible that make use of the described solution even in embodiments that are fundamentally different in nature. All features and/or advantages, including design details, spatial arrangements, and method steps, that derive from the claims, the description, or the drawings, can be essential for the invention individually as well as in a wide variety of combinations.

What is claimed is:

1. A method for joining a lens to a housing of a lighting device of a motor vehicle, in which the housing is accommodated and secured in a receptacle device, the method comprising:
   accommodating the lens in a pre-centering device;
   aligning the lens on the housing, by the pre-centering device, during an alignment procedure; and
   accommodating the lens by a holding device after the alignment procedure;
   holding the lens by the holding device during a subsequent adjustment process,
   releasably attaching the holding device to the pre-centering device via fastening elements during the alignment procedure; and
   moving the pre-centering device, together with the accommodated lens and the holding device attached to the pre-centering device, relative to the receptacle device during the alignment procedure such that the lens and the holding device are aligned on the housing accommodated in the receptacle device.

2. The method according to claim 1, wherein the pre-centering device has a frame element and multiple positioning elements attached to the frame element, wherein the lens is accommodated by the positioning elements during the alignment procedure, and wherein the frame element is moved relative to the receptacle device during the alignment procedure in a setup mode.

3. The method according to claim 2, wherein the holding device is releasably attached to the frame element by the fastening elements during the alignment procedure.

4. The method according to claim 1, wherein the holding device is attached to a tool upper part, wherein the attachment of the holding device to the tool upper part is released before a pre-centering procedure such that the holding device is displaceably mounted on the tool upper part during the alignment procedure, and wherein the attachment of the holding device to the tool upper part is effected after the pre-centering procedure such that the holding device is attached to the tool upper part in a fixed position.

5. The method according to claim 1, wherein reliable displacement of the frame element of the fastening elements and of the holding device is carried out by locating stops during the alignment procedure.

\* \* \* \* \*